US008350940B2

(12) United States Patent
Smith et al.

(10) Patent No.: US 8,350,940 B2
(45) Date of Patent: Jan. 8, 2013

(54) IMAGE SENSORS AND COLOR FILTER ARRAYS FOR CHARGE SUMMING AND INTERLACED READOUT MODES

(75) Inventors: Scott Smith, Saratoga, CA (US); John Ladd, San Jose, CA (US)

(73) Assignee: Aptina Imaging Corporation, George Town (CY)

( * ) Notice: Subject to any disclaimer, the term of this patent is extended or adjusted under 35 U.S.C. 154(b) by 533 days.

(21) Appl. No.: 12/480,659

(22) Filed: Jun. 8, 2009

(65) Prior Publication Data

US 2010/0309351 A1 Dec. 9, 2010

(51) Int. Cl.
*H04N 5/335* (2006.01)
(52) U.S. Cl. ........................ 348/308; 348/272
(58) Field of Classification Search .......... 348/270–282, 348/294–308
See application file for complete search history.

(56) References Cited

U.S. PATENT DOCUMENTS

| | | | | |
|---|---|---|---|---|
| 4,541,010 A * | 9/1985 | Alston | | 348/283 |
| 4,553,159 A * | 11/1985 | Moraillon | | 348/280 |
| 5,341,151 A * | 8/1994 | Knapp | | 345/58 |
| 5,619,225 A * | 4/1997 | Hashimoto | | 345/98 |
| 5,956,086 A * | 9/1999 | Sawanobori | | 348/273 |
| 6,522,356 B1 * | 2/2003 | Watanabe | | 348/272 |
| 6,703,989 B1 * | 3/2004 | Harrold et al. | | 345/32 |
| 6,961,158 B2 * | 11/2005 | Spears | | 358/513 |
| 6,999,119 B1 * | 2/2006 | Shibazaki et al. | | 348/273 |
| 7,382,407 B2 | 6/2008 | Cho et al. | | |
| 7,397,509 B2 | 7/2008 | Krymski | | |
| 7,745,779 B2 * | 6/2010 | Conners | | 250/226 |
| 7,952,768 B2 * | 5/2011 | Kwon et al. | | 382/167 |
| 7,982,786 B2 * | 7/2011 | Nishida et al. | | 348/272 |
| 2003/0128179 A1 * | 7/2003 | Credelle | | 345/88 |
| 2004/0114046 A1 * | 6/2004 | Lee et al. | | 348/279 |
| 2004/0263652 A1 * | 12/2004 | Oda | | 348/272 |
| 2005/0174363 A1 * | 8/2005 | Brown Elliott | | 345/694 |
| 2006/0050956 A1 * | 3/2006 | Tanaka | | 382/162 |
| 2006/0227228 A1 * | 10/2006 | Nam | | 348/272 |
| 2007/0146511 A1 * | 6/2007 | Kinoshita et al. | | 348/272 |
| 2007/0153104 A1 * | 7/2007 | Ellis-Monaghan et al. | | 348/272 |
| 2007/0177236 A1 * | 8/2007 | Kijima et al. | | 358/514 |
| 2007/0285526 A1 | 12/2007 | Mann et al. | | |
| 2008/0018765 A1 * | 1/2008 | Choi et al. | | 348/308 |
| 2008/0062290 A1 * | 3/2008 | Lahav et al. | | 348/280 |
| 2008/0075393 A1 * | 3/2008 | Kwon et al. | | 382/300 |
| 2008/0129853 A1 * | 6/2008 | Watanabe | | 348/294 |
| 2008/0219585 A1 | 9/2008 | Kasai et al. | | |

(Continued)

*Primary Examiner* — Tuan Ho
*Assistant Examiner* — Selam Gebriel
(74) *Attorney, Agent, or Firm* — Treyz Law Group; David C. Kellogg; G. Victor Treyz

(57) ABSTRACT

Image sensors and color filter arrays for in-pixel charge summing and interlaced readout modes may be provided. An image sensor that supports charge summing and interlaced readout modes may include an array of pixels with pairs of adjacent green, red, and blue light-sensitive pixels. An image sensor may implement an in-pixel charge summing readout mode in which charges from pairs of pixels are summed onto a common node and then read out from the common node. An image sensor may implement an interlaced readout mode in which image data is read out from alternating rows of the image sensor. An image sensor may use a shared readout scheme in which a group of four pixels is formed from two pairs of commonly-colored pixels. The four pixels may share circuitry such as a reset transistor, a buffer transistor, and a row select transistor and may connect to a single readout line.

11 Claims, 14 Drawing Sheets

U.S. PATENT DOCUMENTS

2008/0267522 A1 10/2008 Kobayashi
2009/0021612 A1 1/2009 Hamilton et al.
2009/0040349 A1 2/2009 Xu
2009/0040364 A1 2/2009 Rubner

* cited by examiner

IMAGE SENSORS AND COLOR FILTER ARRAYS FOR CHARGE SUMMING AND INTERLACED READOUT MODES

BACKGROUND

The present invention relates to image sensors and, more particularly, to image sensors and color filter arrays for charge summing readout modes and interlaced readout modes.

Modern electronic devices such as cellular telephones, cameras, and computers often use digital image sensors. Image sensors may sometimes be referred to herein as imagers. Imagers may be formed from a two-dimensional array of pixels. Each pixel can be configured to receive incident photons (light) and to convert the incident photons into electrical signals.

Many common imagers use the well known Bayer color filter array (CFA) pattern as this pattern provides a known balance between relatively dense color sampling and a layout that helps to minimize aliasing artifacts. Although the Bayer pattern has many benefits, there are several scenarios in which the Bayer pattern performs poorly. Two examples of operational modes in which the Bayer pattern exhibits poor performance are in-pixel charge summing (binning) modes and interlaced readout modes.

In-pixel charge summing readout modes may be used to improve the signal-to-noise ratio of an image produced by an imager. In an in-pixel charge summing readout mode, photoelectric charges from two pixels may be summed together prior to a readout operation. In order to preserve color sampling output, it may be desirable to only perform in-pixel charge summing for pixels that receive light of the same color. However, summing like-colored pixels in this way can be difficult using the Bayer pattern. For example, since red (R) and blue (B) pixels in the Bayer pattern do not have adjacent neighbors of the same color, creating circuits to sum the charges for red and blue pixels in an imager that uses the Bayer pattern is difficult and requires tradeoffs in performance.

Interlaced readout modes in an imager that uses the Bayer color filter array pattern require two fields to be read out from alternating odd and even row pairs to ensure that both fields contain samples of all three color of the Bayer pattern. Since each field skips two rows (i.e., a row pair), using this type of interlaced readout mode in an imager results in undesirable aliasing artifacts and reduces the resolution of any images produced by the imager.

It would therefore be desirable to provide image sensors and color filter arrays for in-pixel charge summing readout modes and for interlaced readout modes.

DETAILED DESCRIPTION

The present invention relates to image sensors and, more particularly, to image sensors and color filter arrays for in-pixel charge summing readout modes and for interlaced readout modes.

Modern electronic devices such as cellular telephones, cameras, and computer often use digital image sensors (sometimes referred to herein as imagers). The imagers may be formed from a two-dimensional array of light-sensitive pixels arranged in any pattern. As one example, the electronic devices may include an imager that incorporates a color filter array with a non-Bayer pattern, that can implement in-pixel charge summing readout modes, and that can implement interlaced readout modes.

Figure 1:
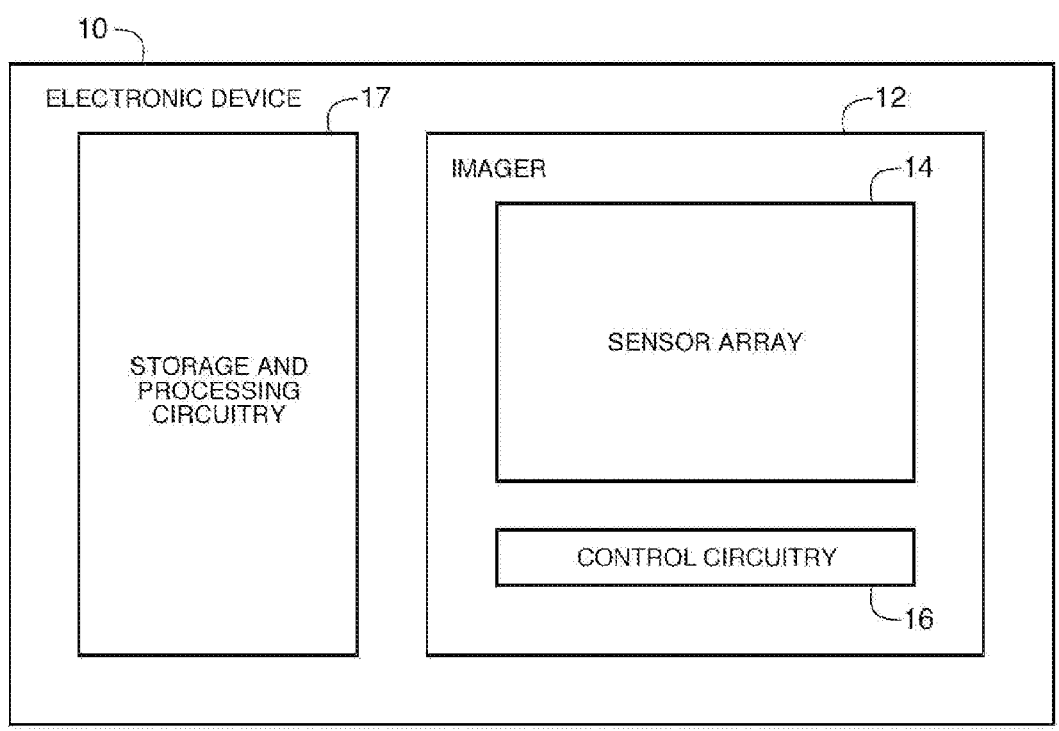
FIG. 1 is a schematic diagram of an illustrative electronic device that may include image sensing circuitry in accordance with an embodiment of the present invention.

An illustrative electronic device that may include image sensing circuitry (e.g., one or more digital image sensors) is shown in FIG. 1. User device 10 may be any electronic device such as a cellular telephone, a camera, a desktop computer, a laptop computer, a handheld gaming device, a hybrid device that combines the functionality of multiple devices, and may be provided in the form of any electronic equipment (in general).

Device 10 may include image sensing circuitry such as imager 12. Imager 12 may sometimes be referred to herein as image sensing circuitry and an image sensor. Imager 12 may include one or more integrated circuits and other components as desired. For example, imager 12 may include an array of light-sensitive pixels such as sensor array 14. Each of the light-sensitive pixels may convert incident light to an electrical signal. As one example, each of the pixels may be formed from a photodetector such as a photodiode with a light sensitive region and may be configured to produce and store (e.g., to accumulate) a charge proportional to the number of photons that impinge upon the light sensitive region. Imager 12 may also include control circuitry 16 that controls the operation of imager 12 and, in particular, that controls the operation of sensor array 14. As examples, control circuitry 16 may be used to reset light-sensitive pixels in sensor array 14 (e.g., to remove accumulated image charges from the light-sensitive pixels during a reset operation), to read out image data from the light-sensitive pixel (e.g., to measure the reset levels of the pixels and the accumulated charges of the pixels during a readout operation), to transfer accumulated charges to charge storage elements in the pixel array (e.g., to transfer the charge accumulated by each pixel into corresponding in-pixel storage elements as part of a readout operation or reset operation), etc. If desired, control circuitry 16 may include one or more analog-to-digital converters that can be used to convert analog signals from the sensor array 14 to digital signals that can be processed by digital circuits in device 10.

Storage and processing circuitry 17 may be included in device 10. Storage and processing circuitry 17 may include one or more different types of storage such as hard disk drive storage, nonvolatile memory (e.g., flash memory or other electrically-programmable-read-only memory), volatile memory (e.g., battery-based static or dynamic random-access-memory), etc. Processing circuitry in storage and processing circuitry 17 may be used to control the operation of device 10 and imager 12. Processing circuitry 17 may be based on a processor such as a microprocessor and other integrated circuits. For example, storage and processing circuitry 17 may be used to run software on device 10, such as image processing applications, image display applications, operating system functions, power management functions, etc. Storage and processing circuitry 17 may be used to store image data such as images captured by sensor array 14 of imager 12. If desired, storage and processing circuitry 17 may be used to store image data during image processing operations.

Sensor array 14 may be formed from a plurality of pixels and may be organized using any architecture. As an example, the pixels of sensor array 14 may be organized in a series of horizontal rows and vertical columns. As another example, the pixels of sensor array 14 may be organized in a series of diagonal rows and columns (e.g., a series of rows and columns that are rotated 45 degrees from vertical). The pixels of array 14 may be interconnected by various conductors arranged in any pattern. For example, conductors arranged horizontally may interconnect rows of sensors and conductors arranged vertically may interconnect columns of sensors. As another example, conductors arranged horizontally in a zigzag pattern may interconnect rows of sensors and conductors arranged vertically may interconnect columns of sensors. The conductors may include global conductive lines that span substantially all of the sensors of array 14.

Figure 2:
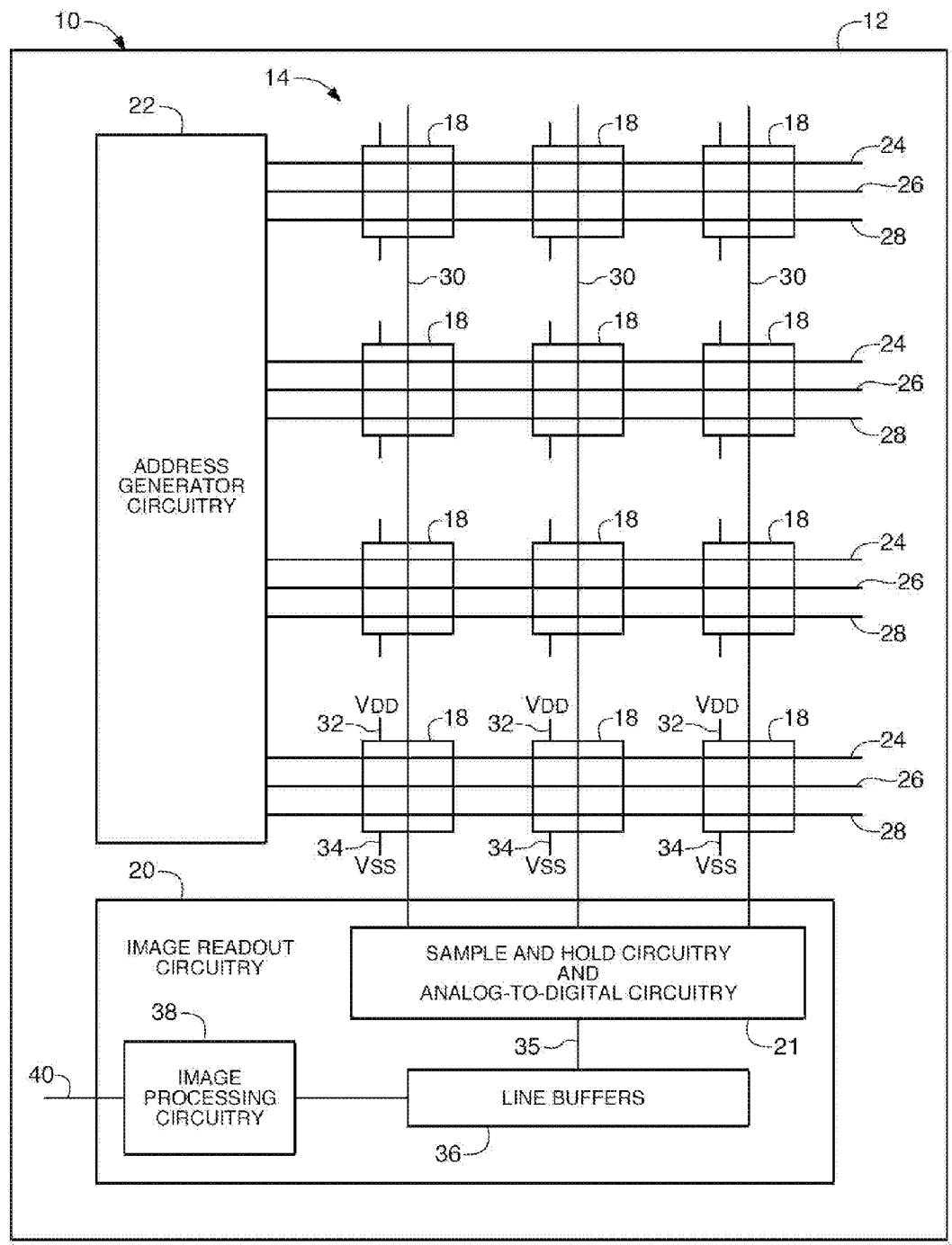
FIG. 2 is a schematic diagram of an illustrative array of pixels and control circuitry coupled to the array of pixels that may be a part of the image sensing circuitry of FIG. 1 in accordance with an embodiment of the present invention.

An example of an arrangement for sensor array 14 is shown in FIG. 2. As shown in FIG. 2, device 10 may include an array 14 of pixels 18 coupled to image readout circuitry 20 and address generator circuitry 22. As an example, each of the pixels 18 in a row of array 14 may be coupled to address generator circuitry 22 by one or more conductive lines such as lines 24, 26, and 28. Array 14 may have any number of rows and columns. In general, the size of array 14 and the number of rows and columns in array 14 will depend on the particular implementation.

As one example, lines 24 may be reset lines that can be used to couple the pixels 18 in a particular row to a power supply terminal such as positive power supply terminals 32 or ground power supply terminals 34 to reset the pixels 18. In one example, accumulated charges on the pixels 18 may be erased by connecting the pixels 18 to a power supply terminal such as terminal 32 and/or 34 and allowing accumulated charges to dissipate into power supply lines in circuitry 12. If desired, circuitry 12 may include a global reset line that resets all of the pixels 18 in array 14 simultaneously. With this type of arrangement, the reset lines 24 may be connected together to form a single global reset line. Reset lines 24 may carry signals that control reset transistors in pixels 18 and that are sometimes referred to as pixel reset pointers.

Control lines 26 may be used to control transfer transistors in the pixels 18. For example, control lines 26 may be transfer lines that are used to transfer accumulated charges in the pixel 18 from light sensitive devices (e.g., photodiodes or other light sensitive devices) to storage elements (e.g., floating diffusion nodes or other storage elements) in the pixels 18.

If desired, the control lines 26 may be connected together to form one or more global transfer lines. With this type of arrangement, a global transfer line 26 may be used to implement a global shutter scheme in which the accumulated charges from a plurality of pixels 18 in different rows of array 14 are simultaneously transferred to the respective storage elements. The accumulated charges may then be read out from the storage elements at a later time. Transfer lines 26 may convey signals sometimes referred to as transfer pointers or global transfer pointers (as examples).

With one arrangement, transfer lines 26 may be used in conjunction with reset lines 24 during a reset operation of the pixels 18. As one example, transfer signals on transfer lines 26 and reset signals on reset lines 24 may be asserted simultaneously during a reset operation (e.g., so that the reset operation discharges accumulated charges from the storage elements and the light sensitive devices in each of the pixels 18).

Control lines 28 may be, for example, connected to readout transistors in the pixels 18 of array 14. With this type of arrangement, row select signals, sometimes referred to herein as readout signals and pixel read pointers, may be asserted on control lines 28 (e.g., row select lines 28) to connect a row of pixels 18 to image readout circuitry 20. For example, when row select signals are asserted on a given row select line 28, the pixels 18 associated with the given row select line 28 may be coupled to image readout circuitry 20 through column readout lines 30. When a row of pixels 18 is coupled to image readout circuitry 20, signals representative of the accumulated charge on the pixels 18 may be conveyed over column readout lines 30 to circuitry 20 (e.g., analog-to-digital converters that convert the signals from the image sensing pixels 18 to digital signals).

If desired, imager 12 may implement an in-pixel charge summing scheme in which the accumulated charges of two or more pixels 18 are summed together before being read out by circuitry 20. With this type of arrangement, transfer lines 26 may be used to control the transfers of the accumulated charges of two or more pixels 18 to common storage elements (e.g., a common floating diffusion node) shared by the two or more pixels 18 before or during an image readout operation.

With one arrangement, imager 12 may implement a shared readout scheme in which a single reset transistor, a single readout transistor, and a single buffer transistor are shared between a group of pixels 18. As one example, the transfer transistors of the group of pixels 18 may be connected together at a common node. The common node may then be coupled to the reset transistor, readout transistor (i.e., the row select transistor), and the buffer transistor shared by the group of pixels 18.

As one example, imager 12 may implement a shared readout scheme in conjunction with an in-pixel charge summing scheme. In this example, a group of four pixels 18 may share a common node, a single reset transistor, a single readout transistor, and a single buffer transistor. The group of four pixels 18 may include two pairs of pixels 18 that receive light of the same color (e.g., two green pixels and two blue pixels or two green pixels and two red pixels). The charges of the pixels that receive light of the same color may be summed on the common node before being read out by circuitry 20.

Address generator circuitry 22 may generate signals on control paths 24, 26, and 28, as desired. For example, address generator circuitry 22 may generate reset signals on paths 24, transfer signals on paths 26, and row select (e.g., row readout) signals on paths 28 to control the operation of array 14. Address generator circuitry 22 may be formed from one or more integrated circuits. If desired, address generator circuitry 22 and array 14 may be integrated together in a single integrated circuit (as an example).

Image readout circuitry 20 may include circuitry 21, line buffers 36 and image processing circuitry 38. Circuitry 21 may include sample and hold circuitry and analog-to-digital converter circuitry. As one example, circuitry 21 may be used to measure the charges of pixels 18 from a row of array 14 and may be used to hold the charges while analog-to-digital converters in circuitry 21 convert the charges to digital signals. The digital signals may be representative of the accumulated charges from the pixels 18. The digital signals produced by the analog-to-digital converters of circuitry 21 may be conveyed to line buffers 36 (e.g., short-term storage) over path 35.

Line buffers 36 may be used to temporarily store digital signals from circuitry 21 for use by image processing circuitry 38. In general, image readout circuitry 20 may include any number of line buffers 36. For example, each line buffer 36 may hold digital signals representative of the charges read from each of the pixels 18 in a given row of array 14.

Image processing circuitry 38 may be used to process the digital signals held in line buffers 36 to produce output data on path 40. If desired, the output data may include image data encoded in any format that can be stored in storage and processing circuitry 17 and displayed by device 10 or transferred to another electronic device or other external computing equipment as desired.

Figure 3:
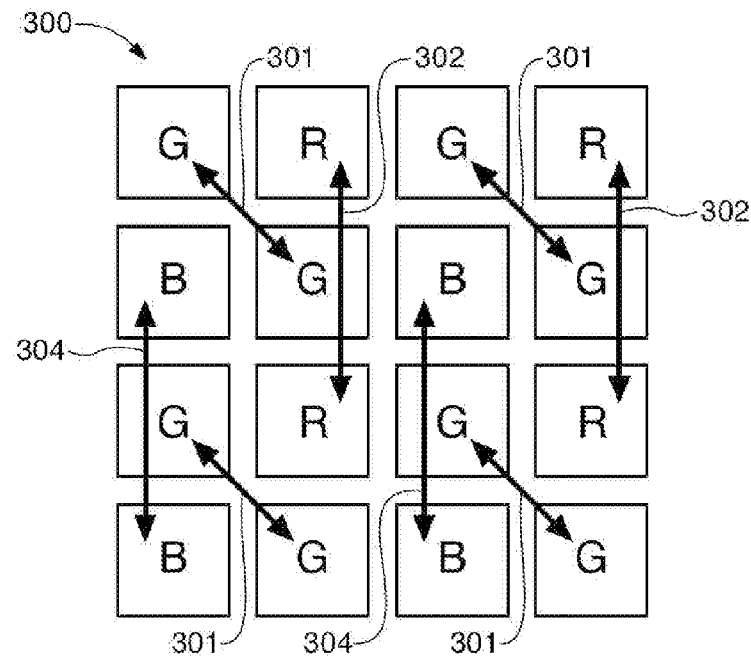
FIG. 3 is diagram showing an in-pixel charge summing readout mode in a conventional imager that implements the Bayer color filter array pattern.

A diagram of a conventional Bayer color filter array pattern 300 used in imagers is shown in FIG. 3. As shown in FIG. 3, conventional imagers use the Bayer pattern 300 in implementing an in-pixel charge summing readout mode. The charges of pairs of green pixels are summed together (as indicated by lines 301), the charges of pairs of red pixels are summed together (as indicated by line 302), and the charges of pairs of blue pixels are summed together (as indicated by line 304). However, the distance between adjacent blue and red pixels in pattern 300 reduces the performance of an imager that uses the Bayer color filter array pattern 300. In particular, there is a reduction in pixel conversion gain due to larger routing capacitances (e.g., longer lines between the pairs of blue and red pixels that are summed), there is a loss of pixel sensitivity to light due to additional circuitry that reduces the photo-sensitive area of each pixel (e.g., summing lines that cross the green pixels reduce the photo-sensitive area of the green pixels), and there is a loss of resolution due to the distances between the pairs of red and blue pixels over which summing occurs. For at least these reasons, the Bayer color filter array pattern 300 is not ideal for in-pixel charge summing readout modes.

Figure 4:
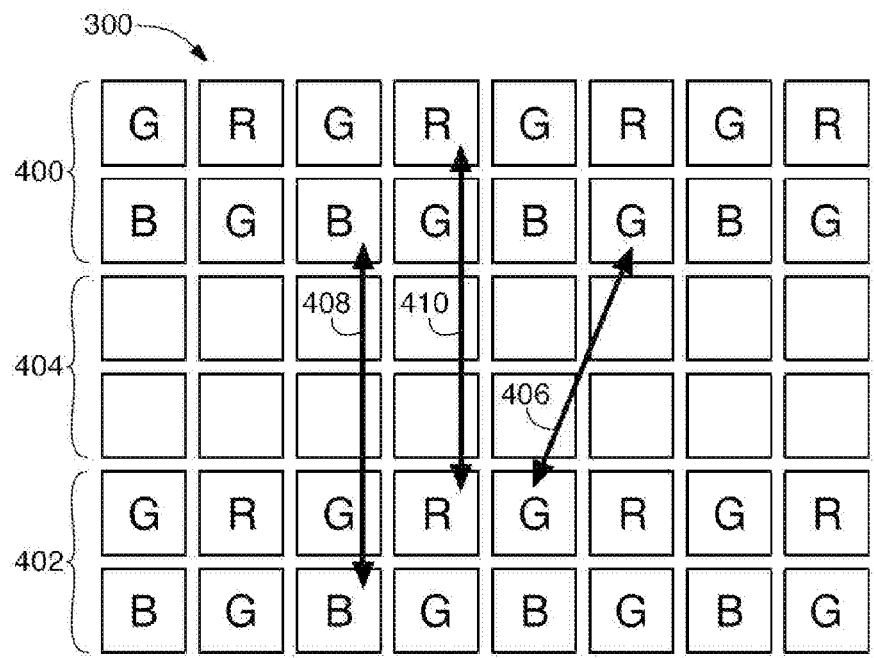
FIG. 4 is a diagram showing an interlaced readout mode in a conventional imager that implements the Bayer color filter array pattern.

As shown in FIG. 4, the conventional Bayer color filter array pattern 300 of FIG. 3 is also used in imagers with interlaced readout modes. In an interlaced readout, two fields are read out from alternating odd and even row pairs such that each field includes samples of all of the colors (red, blue, and green) for use in reconstructing a full color image for each field. FIG. 4 illustrates how row pair 400 and row pair 402 may be used to capture a first field. The second field corresponds to the row pair 404. As one example, image data from the row pairs 400 and 402 may be used to interpolate image data for the row pair 404 to create a full color image (without actually reading out image data from the row pair 404). The distance between the closest pairs of green pixels that cross row pair 404 (illustrated by line 406) is 2.2 times the pixel size, the distance between the closest pairs of blue pixels that cross row pair 404 (illustrated by line 108) is 3 times the pixel size, and the distance between the closest pairs of blue pixels that cross row pair 404 (illustrated by line 110) is 3 times the pixel size. Because each field captured in this arrangement skips pairs of rows (i.e., because of the distance between the closest pairs of red, blue, and green pixels that cross one row pair 404), this type of arrangement creates undesirable aliasing artifacts and reduces the resolution of the final image after field reconstruction. For at least these reasons, the Bayer color filter array pattern 300 is not ideal for interlaced readout modes.

Figure 5:
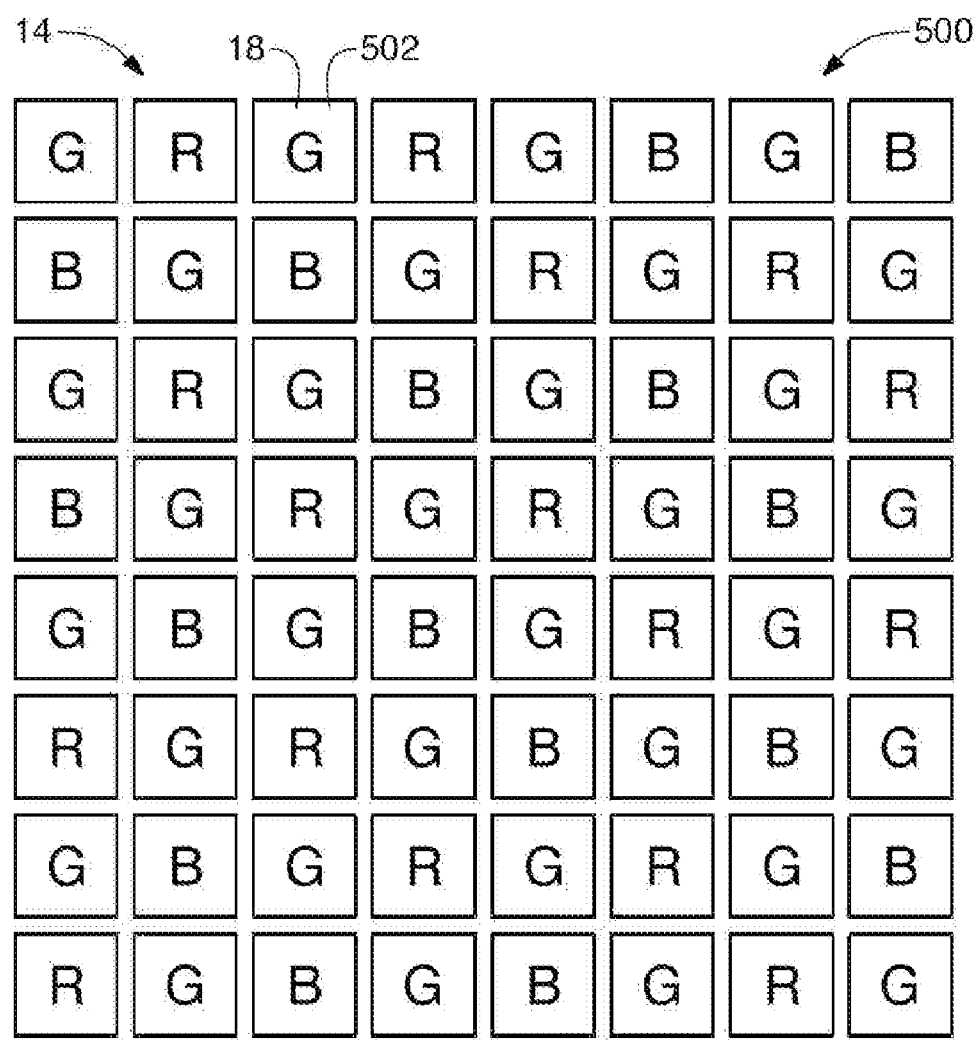
FIG. 5 is a diagram of an illustrative color filter array pattern that may include diagonally adjacent pairs of red, blue, and green filters and that may be a part of an imager in accordance with an embodiment of the present invention.

An embodiment of a color filter array pattern that may include diagonally adjacent pairs of red, blue, and green filters is illustrated in FIG. 5. With one arrangement, array 14 (FIG. 2) may incorporate the pattern 500 such that each of the pixels 18 of array 14 are associated with one of the filters 502 of pattern 500 (as an example). With this type of arrangement, the pixels 18 labeled with "R" may receive red light, the pixels 18 labeled with "B" may receive blue light, and the pixels 18 labeled with "G" may receive green light. The pixels are therefore sometimes referred to herein as red pixels 18, blue pixels 18, and green pixels 18.

In the example of FIG. 5, the green filters 502 (and hence the green pixels 18) may be arranged in a checkerboard layout and the blue and red filters 502 may be staggered such that each red and blue pixel 18 has a diagonally adjacent neighbor of the same color. This type of arrangement facilitates charge summing between two diagonally adjacent pixels 18 for each of the three colors of pattern 500.

Figure 6:
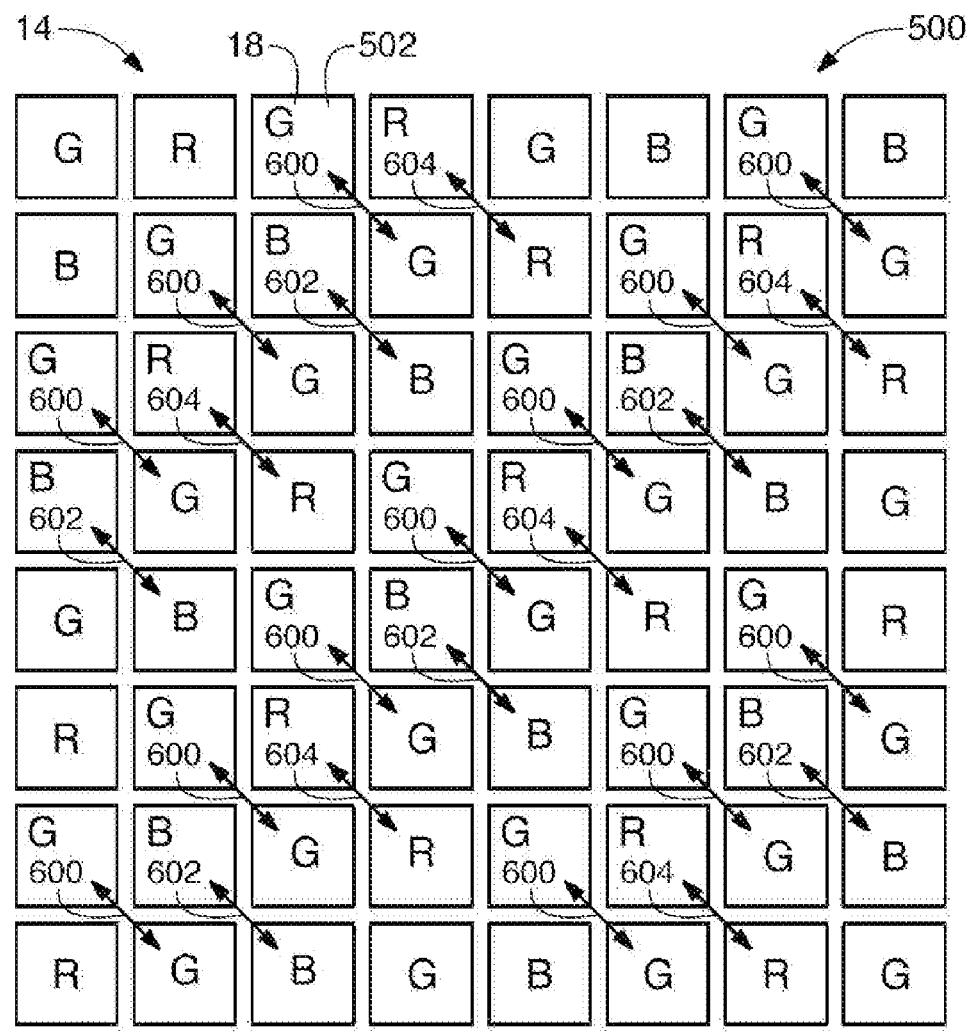
FIG. 6 is a diagram of an illustrative imager that may incorporate the color filter array pattern of FIG. 5 and that may implement an in-pixel charge summing readout mode in accordance with an embodiment of the present invention.

An example of how array 14 of FIG. 2 may incorporate the color filter array pattern 500 of FIG. 5 and may implement an in-pixel charge summing readout mode is shown in FIG. 6. The example of FIG. 6 illustrates one potential way in which accumulated charges (e.g., charges accumulated in response to incident light on the pixels 18) of two or more pixels 18 can be summed together before being read out by image readout circuitry such as circuitry 20 of FIG. 2. By summing the charges of two or more pixels 18 together, the signal-to-noise ratio of an image produced by array 14 (e.g., produced by imager 12 of FIG. 1) may be improved. By increasing the signal-to-noise ratio of the image, it may be easier for the signals from pixels 18 to overcome any noise in read out circuitry 20 (e.g., from amplifiers, analog-to-digital converters, etc.).

As shown in FIG. 6, the charges of diagonally adjacent green pixels 18 may be summed together (as indicated by lines 600), the charges of diagonally adjacent blue pixels 18 may be summed together (as indicated by lines 602), and the charges of diagonally adjacent red pixels may be summed together (as indicated by lines 604). The arrangement of FIGS. 5 and 6 decreases the routing capacitance associated with summing pixels together (thereby increasing conversion gain of pixels 18), increases the light sensitivity of the pixels 18 (by avoiding routing charge summing lines across pixels 18), and increases the resolution of the image produced by imager 12 (by decreasing the distance over which summing occurs) relative to arrangements which utilize the Bayer pattern such as the arrangement of FIG. 3.

The color filter array pattern 500 of FIG. 5 can be used for interlaced readout modes that use odd rows for a first field and even rows for a second field. (In contrast, the conventional arrangement of FIG. 4 uses odd row pairs and even row pairs.) An example of how array 14 of FIG. 2 may incorporate the color filter array pattern 500 and may implement an interlaced readout mode is shown in FIG. 7.

Figure 7:
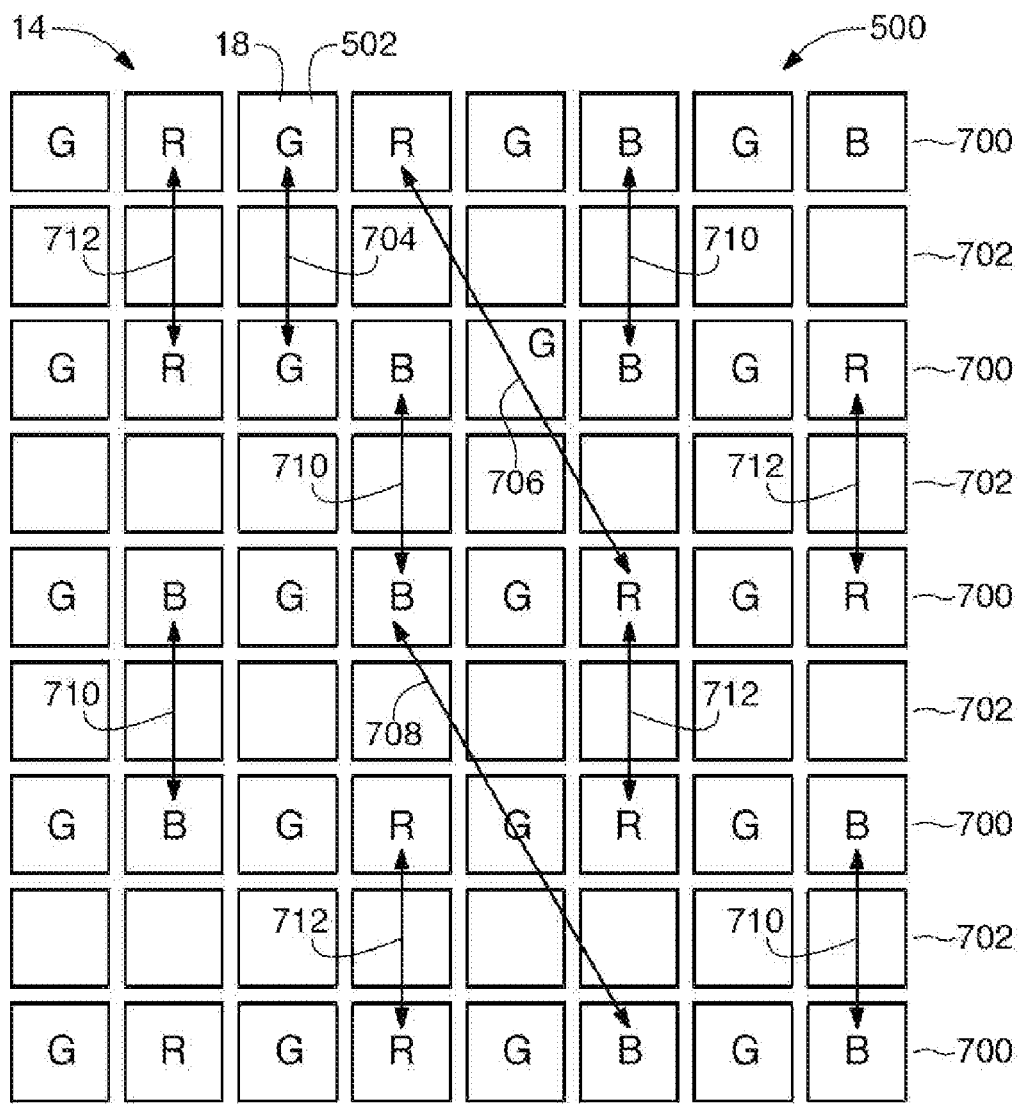
FIG. 7 is a diagram of an illustrative imager that may incorporate the color filter array pattern of FIG. 5 and that may implement an interlaced readout mode in accordance with an embodiment of the present invention.

As shown in the example of FIG. 7, array 14 may incorporate the color filter array pattern 500 and may implement an interlaced readout mode in which the odd rows of array 14 (e.g., rows 700) correspond to a first interlaced field and the even rows of array 14 (e.g., rows 702) correspond to a second interlaced field. With this type of arrangement, imager 12 of FIG. 1 may alternate between reading image data from the two interlaced fields. For example, imager 12 may alternate between reading image data from rows 700 of array 14 to form first interlaced images and reading image data from rows 702 to form second interlaced images.

With one arrangement, imager 12 may capture the first interlaced images at a rate of 60 Hz and may capture the second interlaced images at a rate of 60 Hz. With this type of arrangement, imager 12 may create a video with full resolution (e.g., image data from rows 700 and 702 of array 14) at a frame rate of 30 Hz by combining pairs of first and second interlaced images (as one example).

With another arrangement, imager 12 may create a full resolution image for each interlaced image captured by array 14 (e.g., for each image captured using rows 700 and/or for each image captured using rows 702). With this type of arrangement, imager 12 may interpolate missing data as part of creating the full resolution images. For example, when imager 12 is creating a full resolution image from image data captured by rows 700, imager 12 (e.g., image processing circuitry 38 of FIG. 2) may interpolate data for rows 702 by using data from rows 700.

The arrangement of FIG. 7 may be used to produce images that have sampling resolutions that are superior to the conventional arrangement of FIG. 4. For example, the distance between pairs of green pixels 18 that cross at least one row 702 (illustrated by line 704) may be approximately equal to the size of a single pixel 18. In contrast, in the arrangement of FIG. 4, the distance between the closest pairs of green pixels that cross one row pair 404 is 2.2 times the pixel size. While the maximum distance between pairs of blue pixels 18 and pairs of red pixels 18 that cross one at least one row 702 (illustrated by lines 706 and 708) may be approximately 3.6 times the size of a pixel 18 (which is slightly larger than the 3 times pixel size distance of the FIG. 4 arrangement), the resolution of the blue and red pixels 18 of array 14 may not have as significant an impact on the final resolution of images as the green pixels 18. In addition, there are a number of pairs of blue pixels 18 and pairs of red pixels 18 that cross a row 702 and that are separated by a distance approximately equal to the size of a single pixel 18 (illustrated by lines 710 and 712). Because the sampling resolution of green pixels 18 may have the largest effect on the total sampling resolutions of images produced by imager 12, the improved sampling resolution of green pixels 18 may be used by imager 12 to produce images that have relatively high resolutions after frame reconstruction (e.g., after de-interlacing an image captured using rows 700) and may also be used to reduce aliasing artifacts in the images.

Figure 8:
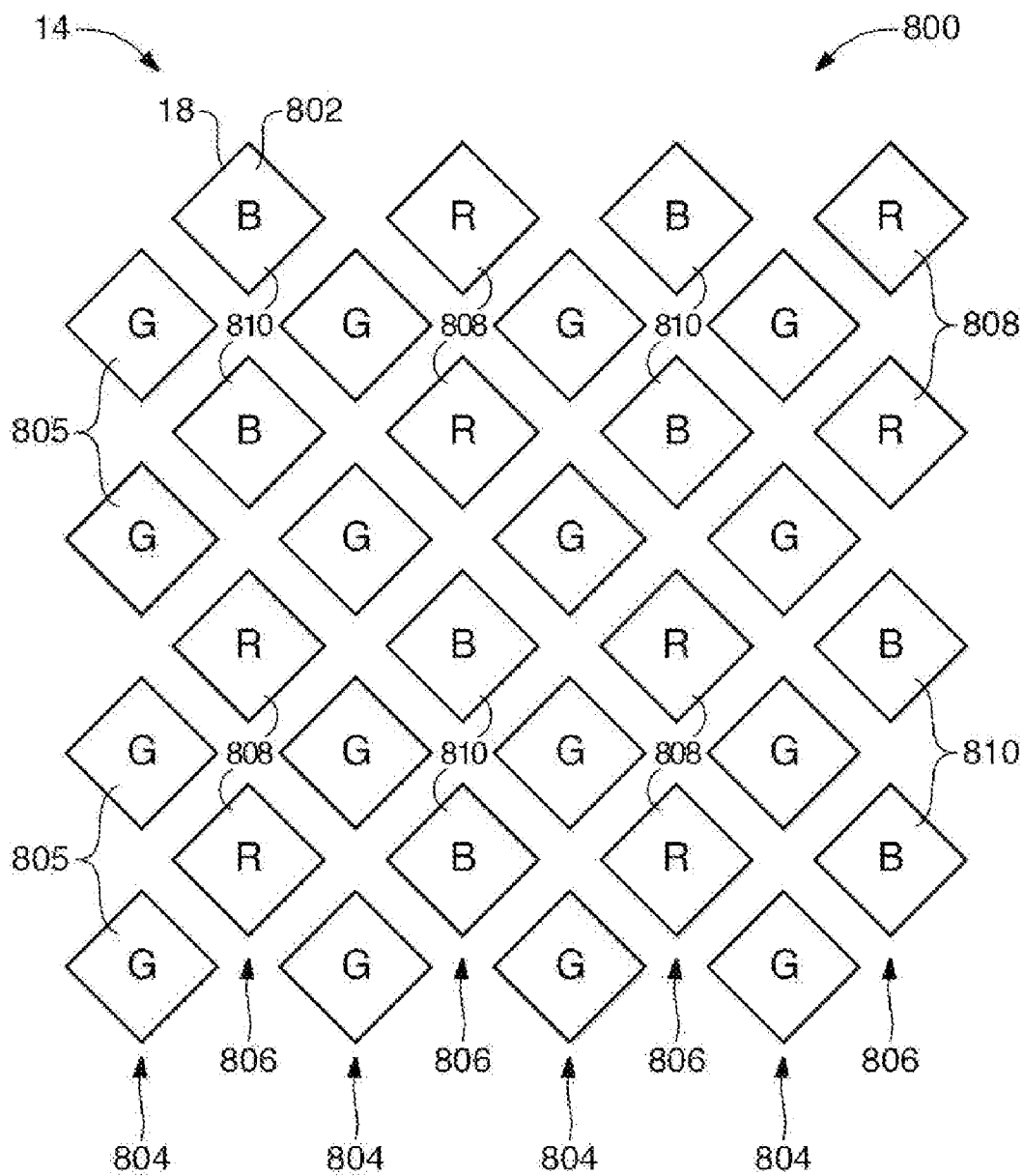
FIG. 8 is a diagram of an illustrative color filter array pattern that may include vertically adjacent pairs of red, blue, and green filters and that may be a part of an imager in accordance with an embodiment of the present invention.

An embodiment of a color filter array pattern that may include vertically adjacent pairs of red, blue, and green filters is illustrated in FIG. 8. The color filter array pattern 800 of FIG. 8 may be a pattern similar to the color filter array pattern 500 of FIG. 5 rotated 45 degrees clockwise (as an example). With one arrangement, array 14 (FIG. 2) may incorporate the pattern 800 such that each of the pixels 18 of array 14 are associated with one of the filters 802 of pattern 800 (as an example).

In the example of FIG. 8, the green filters 802 (and hence the green pixels 18) may be arranged in columns 804 of vertically adjacent green filters 802. If desired, the green pixels may be connected together in vertically adjacent pairs (illustrated by pairs 805). The blue and red filters 802 may be located such that each red and blue pixel 18 has a vertically adjacent neighbor of the same color. For example, columns 806 of color filter array 800 may include alternating pairs of red filters 802 (illustrated by pairs 808) and pairs of blue filters 802 (illustrated by pairs 810). This type of arrangement facilitates charge summing between two vertically adjacent pixels 18 for each of the three colors of pattern 500.

Figure 9:
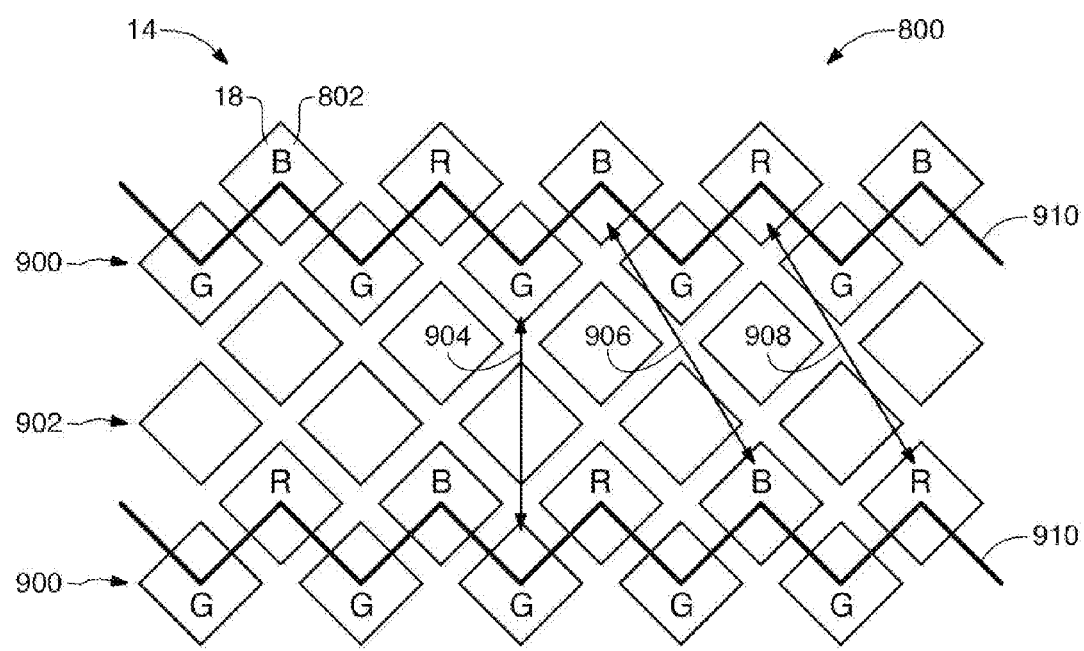
FIG. 9 is a diagram of an illustrative imager that may incorporate the color filter array pattern of FIG. 8 and that may implement an interlaced readout mode in accordance with an embodiment of the present invention.

As shown in the example of FIG. 9, array 14 may incorporate the color filter array pattern 800 of FIG. 8 and may implement an interlaced readout mode in which the odd rows of array 14 (e.g., rows 900 that zigzag across array 14) correspond to a first interlaced field and the even rows of array 14 (e.g., rows 902 that zigzag across array 14) correspond to a second interlaced field. With this type of arrangement, imager 12 of FIG. 1 may alternate between reading image data from the two interlaced fields. For example, imager 12 may alternate between reading image data from rows 900 of array 14 to form first interlaced images and reading image data from rows 902 to form second interlaced images. If desired, imager 12 may de-interlace the images from row 900 and/or row 902 to form full resolution images.

With one arrangement, row control lines such as lines 24, 26, and 28 of FIG. 2 may be routed along paths 910 (as one example) and may be coupled to the rows 900 and 902 of array 14. With this type of arrangement, one or more column readout lines such as lines 30 of FIG. 2 may be connected to each of the pixels 18 in the rows 900 and 902 of array 14.

If desired, imager 12 may create a full resolution image for each interlaced image captured by array 14 (e.g., for each image captured using rows 900). With this type of arrangement, imager 12 may interpolate missing data as part of creating the full resolution image. For example, when imager 12 is creating a full resolution image from image data captured by rows 900, imager 12 (e.g., image processing circuitry 38 of FIG. 2) may interpolate data for rows 902 by using data from rows 900.

The arrangement of FIG. 9 may be used to produce images that have relatively high sampling resolutions. For example, the distance between pairs of green pixels 18 that cross at least one row 902 (illustrated by line 904) may be approximately equal to 1.4 times the size of a single pixel 18. The distance between pairs of blue pixels 18 and green pixels 18 that cross at least one row 902 (illustrated by lines 906 and 908, respectively) may be approximately equal to 2.2 times the size of a single pixel 18. Because of the relatively short distance between red and blue pixels 18 in pattern 800, an imager 12 that incorporates that color filter array pattern 800 may be able to produce full resolution images from interlaced images (e.g., images creating using rows 900) that have relatively high resolutions and may reduce aliasing artifacts in the images.

Figure 10:
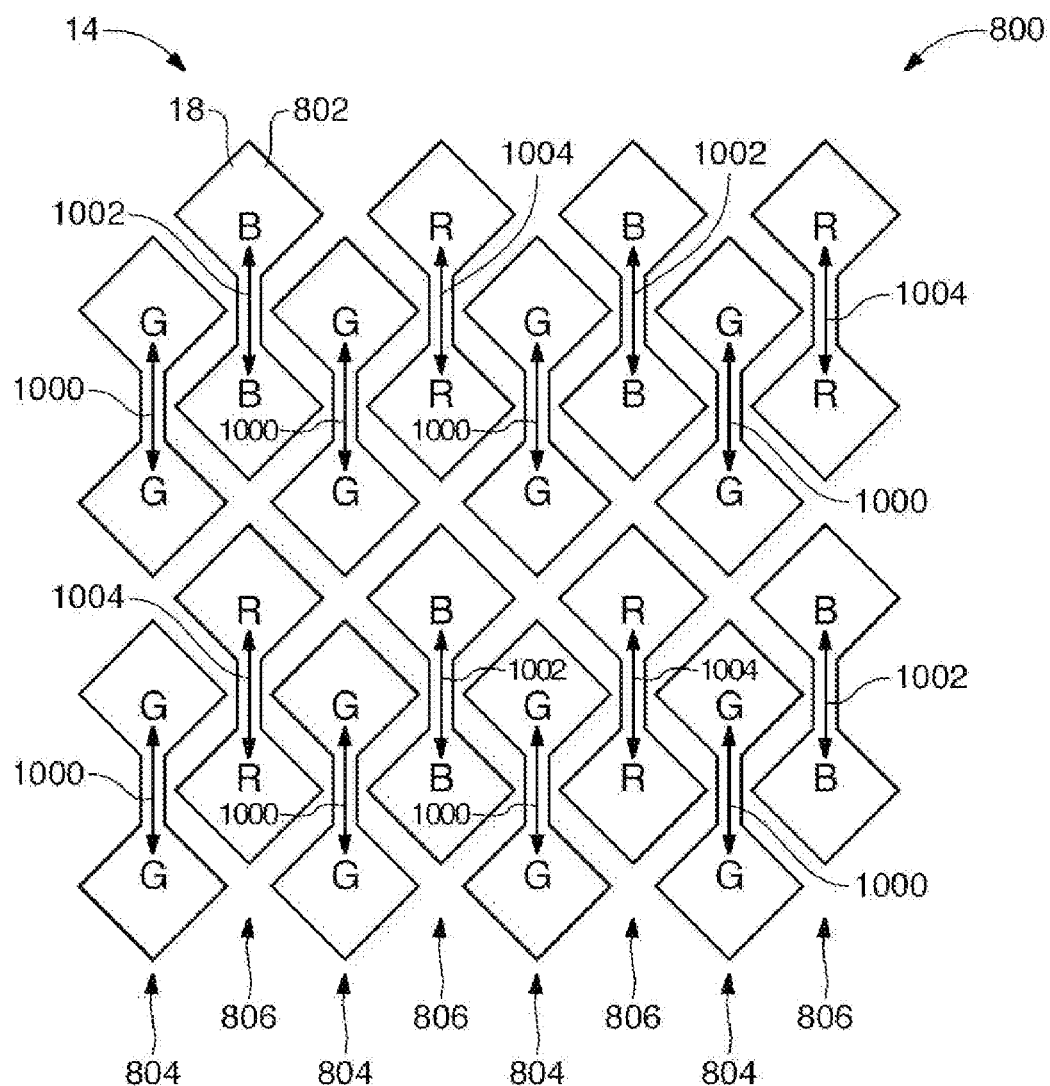
FIG. 10 is a diagram of an illustrative imager that may incorporate the color filter array pattern of FIG. 8 and that may implement an in-pixel charge summing readout mode in which charge summing may be performed vertically among commonly-colored pixels in accordance with an embodiment of the present invention.

An example of how array 14 of FIG. 2 may incorporate the color filter array pattern 800 of FIG. 8 and may implement an in-pixel charge summing readout mode is shown in FIG. 10. The example of FIG. 10 illustrates one potential arrangement for summing together the accumulated charges of two or more pixels 18 before the charges are read out by image readout circuitry such as circuitry 20 of FIG. 2. As shown in FIG. 10, the charges of vertically adjacent green pixels 18 may be summed together (as indicated by lines 1000), the charges of vertically adjacent blue pixels 18 may be summed together (as indicated by lines 1002), and the charges of vertically adjacent red pixels 18 may be summed together (as indicated by lines 1004).

Figure 11:
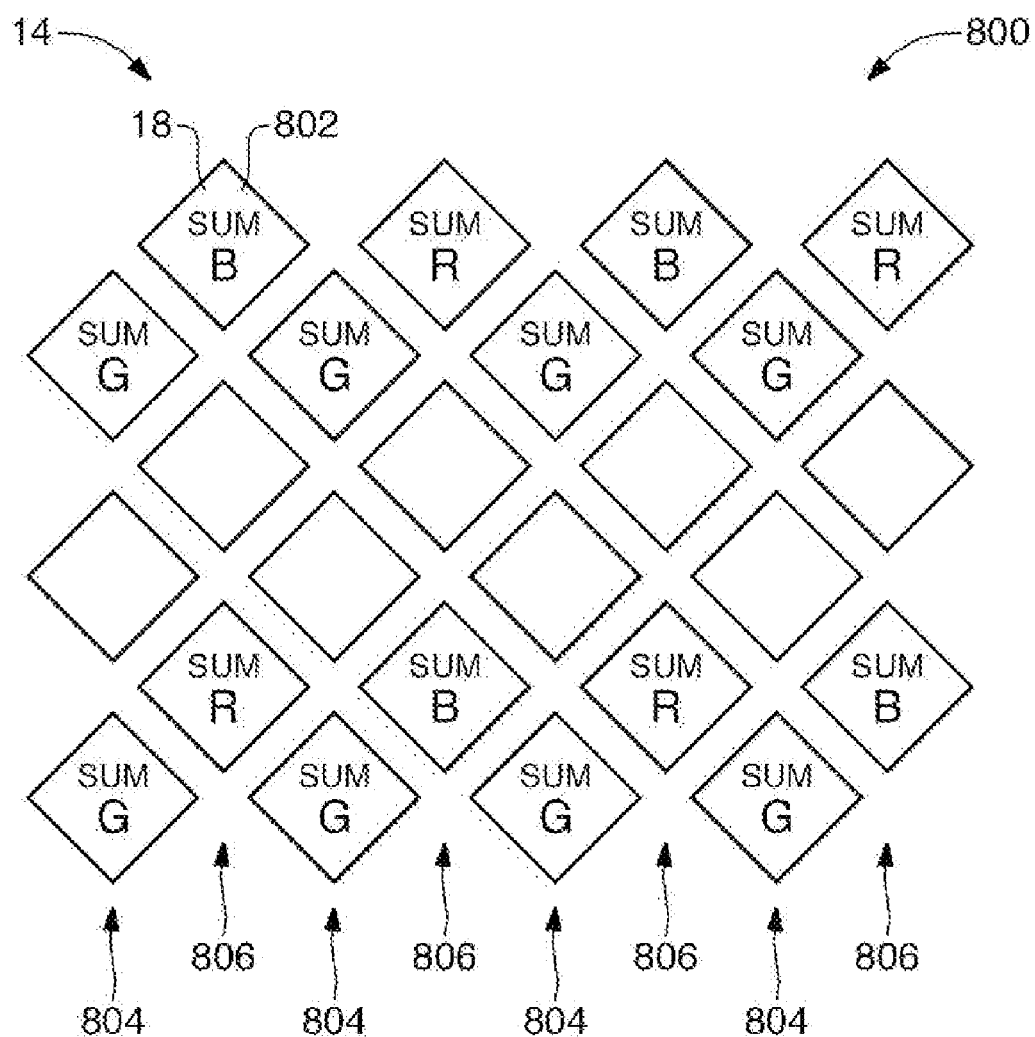
FIG. 11 is a diagram of the illustrative color filter array pattern of FIG. 8 that shows an example of the effective sampling resolution of an imager that incorporates the color filter array pattern after the charges of vertically adjacent and commonly-colored pixels have been summed together in accordance with an embodiment of the present invention.

FIG. 11 illustrates the effectively sampling resolution of an array 14 that incorporates the color filter array pattern 800 of FIG. 8 and that implements an in-pixel charge summing readout mode. As shown in FIG. 11, the final resolution of an image produced by the array 14 using the in-pixel charge summing readout mode may be approximately half the resolution (in the vertical direction) as the array 14 would produce as part of a normal readout mode that did not sum together the charges of pairs of the pixels 18.

Figure 12:
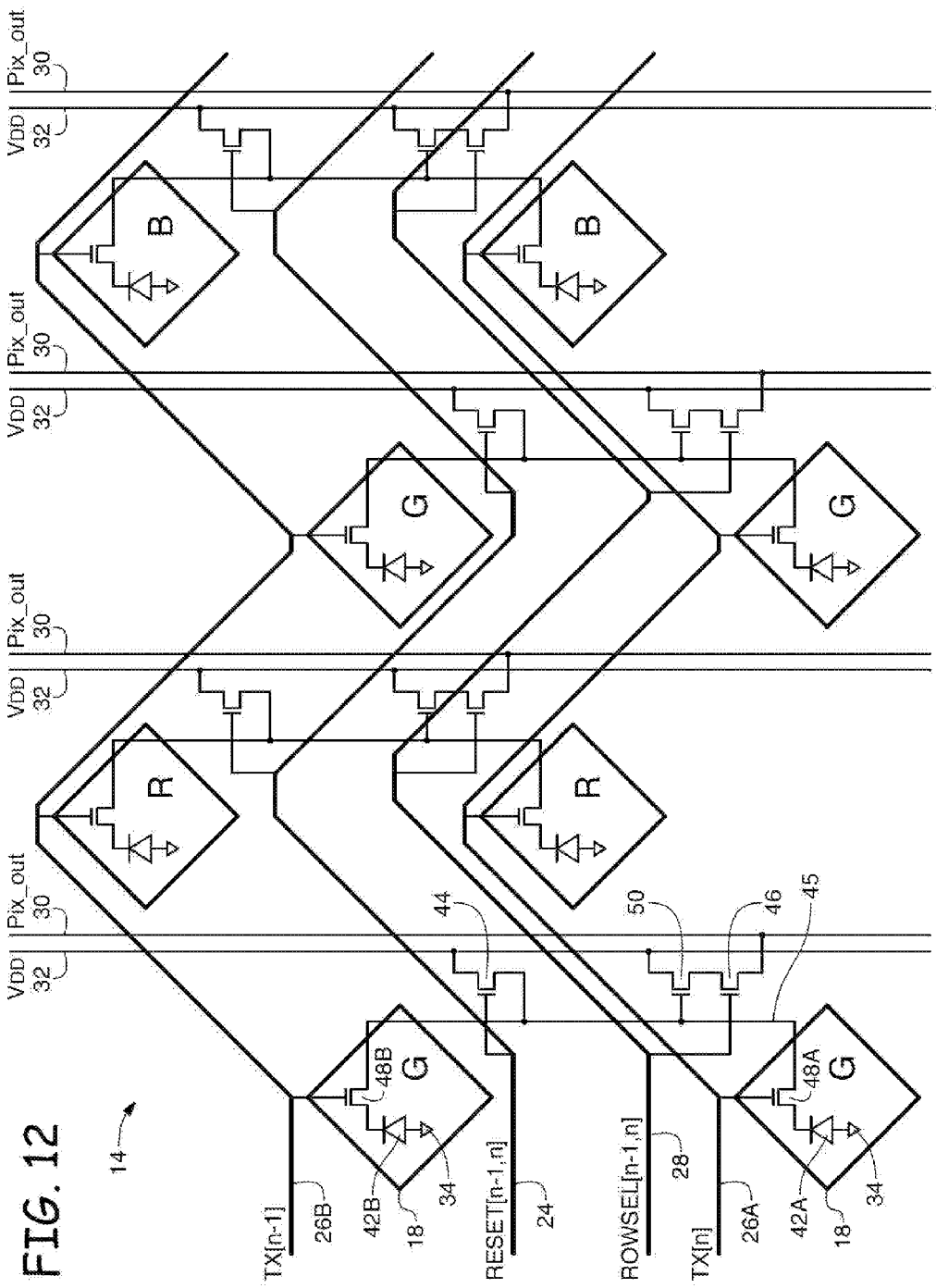
FIG. 12 is a diagram of illustrative light-sensitive pixels that may be a part of an imager that implements an in-pixel charge summing readout mode and that incorporates a color filter array pattern such as the color filter array pattern of FIG. 8 in accordance with an embodiment of the present invention.

One potential way in which array 14 may implement an in-pixel charge summing readout mode is shown in FIG. 12. As shown in the example of FIG. 12, pairs of image sensors 18 may be coupled to shared reset lines 24 (FIG. 2), shared row select lines 28, shared power supply lines 32 and 34, shared image readout lines 30, and a shared node 45 (e.g., a charge summing line 45). As an example, pairs of green, red, and blue pixels 18 from two rows of array 14 (e.g., rows n and n-1) may share a reset line 24, a row select line 28, a power supply lines 32 and 34, and an image readout line 30 of FIG. 2.

FIG. 12 also illustrates an example of image sensing pixels 18 that may be used in array 14 of FIG. 2. Array 14 may be configured to sum the charges of pairs of the pixels 18 prior to an image readout operation. As shown in FIG. 12, each pixel 18 may include a transfer transistor 48 (e.g., pixels in row n 18 may include a transfer transistor 48A and pixels in row n-1 may include a transfer transistor 48B). Each pair of pixels 18 whose charges may be summed prior to an image readout operation may include a shared reset transistor 44, a shared readout transistor 46 (sometimes referred to herein as a row select transistor 46), and a shared buffer transistor 50 (sometimes referred to herein as a source follower transistor 50) and may be coupled to a shared node 45 (e.g., a charge summing line 45).

Each pixel 18 may include a photosensitive device such as photodiode 42 (e.g., a photosensitive element 42). The photosensitive device 42 in each pixel 18 of array 14 may accumulate charge in response to incident light (e.g., light which strikes the photosensitive device 42). With one arrangement, the time between a reset operation in which the accumulated charge is reset and a readout operation or a transfer operation (in which the accumulated charge is shifted to a storage element such as floating diffusion node 45) may be referred to herein as an integration time or an exposure time. The accumulated charge generated by the photosensitive device 42 may be proportional to the intensity of the incident light and the integration time. In general, relatively long integration times may be used to capture scenes with relatively low intensities (e.g., to ensure that the accumulated charge is sufficient to overcome noise in array 14) and relatively short integration times may be used to capture scenes with relatively high intensities (e.g., to ensure that the accumulated charge does not reach a saturation point).

Shared reset transistor 44 may be controlled by shared reset line 24. When reset signals (RESET[n-1, n]) on reset line 24 are asserted, transistor 44 may be turned on and may allow accumulated charge on shared node 45 to flow into a power supply line (e.g., through power supply line 32). In one embodiment, transfer signals (TX) on transfer lines 26A and 26B may be asserted simultaneously with the reset signals (RST) such that the accumulated charges on the two photosensitive elements 42A and 42B and the diffusion node 45 shared by pairs of pixels 18 in rows n and n-I are reset simultaneously.

Each of the transfer transistors 48A and 48B in a pair of pixels 18 whose charges can be summed together may be controlled by the respective transfer lines 26A and 26B. When transfer signals TX[n] on transfer line 26A are asserted, transistor 48A may be turned on and may allow charge to flow from photodiode 42A to a shared node 45. When transfer signals TX[n-1] on transfer line 26B are asserted, transistor 48B may be turned on and may allow charge to flow from photodiode 42B to a shared node 45. When transfer signals TX[n] and TX[n-1] on lines 26A and 26B are asserted simultaneously, transistors 48A and 48B may both be turned on and the charges from photodiodes 42A and 42B may be summed onto the shared node 45. If desired, shared node 45 may be a storage element such as a shared floating diffusion node 45.

Shared buffer transistor 50 and shared row select transistor 46 may be used during a readout operation of the pixels 18 in row n, of the pixels 18 in row n-1, and the pairs of pixels 18 in rows n and n-1 when an in-pixel charge summing readout mode is implemented. Readout transistor 46 may be controlled by row select (ROWSEL[n-1,n]) signals on row select line 28 and buffer transistor 50 may be controlled by the charges on shared node 45. When row select signals on line 28 are asserted, transistor 46 may be turned on and the charge on node 45 may be used to control transistor 50. The voltage that the charge on node 45 applies to the gate of transistor 50 may then determine the voltage of column readout (Pix_out) line 30. Image readout circuitry 20 of FIG. 2 may then determine the voltage of the accumulate charge by sampling the voltage of line 30. If desired, the image readout circuitry 20 may utilize a correlated double sampling technique in which the reset level of the node 45 is also measured.

Because the charges from photosensitive elements 42A and 42B may be summed before the source follower transistor 50, the effective noise level of the source follower transistor 50 may be reduced by approximately half (e.g., as the signal received by transistor 50 is approximately doubled).

Figure 13:
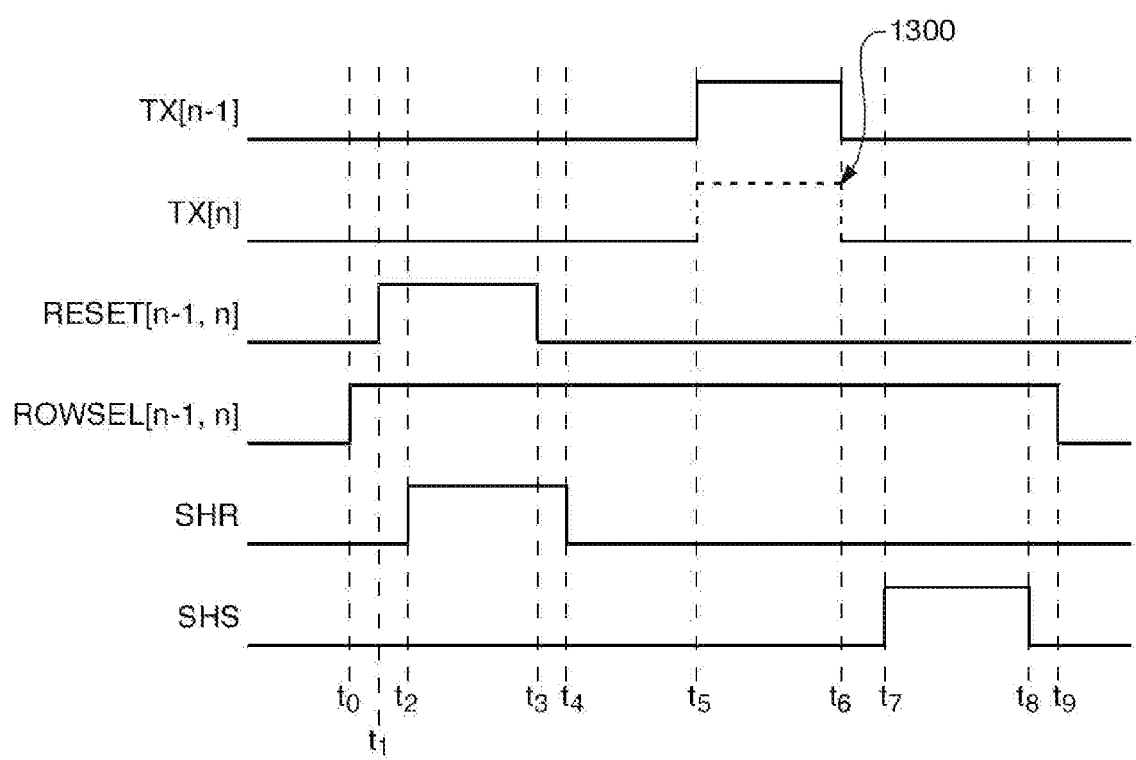
FIG. 13 is a graph that illustrates how control lines coupled to the light-sensitive pixels of FIG. 12 may be used to implement a readout of the pixels and may be used to implement an in-pixel charge summing readout of the pixels in accordance with an embodiment of the present invention.

An example of a readout operation using the arrangement of FIG. 12 is shown in FIG. 13. As shown in FIG. 13, row select signals (ROWSEL[n-1,n]) may be asserted at time t0 thereby coupling the shared buffer transistors 50 to the readout lines 30.

If desired, a reset operation in which the pixels 18 are reset may be performed by asserting reset signals (RESET[n-1,n]) from time t1 to time t3. With one arrangement, image readout circuitry 20 of FIG. 2 may sample the reset level of the shared nodes 45 from time t2 to time t3 by asserting sample and hold reset (SHR) signals in sample and hold circuitry 20.

If in-pixel charge summing has been disabled, a single transfer signal such as TX[n-1] may be asserted between times t5 and t6 to read out a pixel 18 without implementing an in-pixel charge summing mode. With this type of arrangement, a second reset operation may be performed after time t6 and transfer signals TX[n] may be asserted after the second reset operation such that both pixels 18 that share transistors 44, 46, and 50 can be individually read out.

When implementing an in-pixel charge summing mode (as indicated by the dotted transfer signals 1300), transfer signals TX[n-1] and TX[n] may be asserted between times t5 and t6 to transfer and sum the charges from photosensitive elements 42A and 42B onto shared node 45.

Once shared node 45 has been charged from both photosensitive elements 42A and 42B (when implementing in-pixel charge summing) or has been charged from one of the photosensitive element 42A or 42B (when in-pixel charge summing is not being implemented), image readout circuitry 20 of FIG. 2 may sample the signal level of the shared node 45 from time t7 to time t8 by asserting sample and hold signal (SHS) signals in sample and hold circuitry 20.

The row select signals asserted at time t0 (ROWSEL[n-1, n]) may then be deasserted at time t9 to complete the readout operation.

Figure 14:
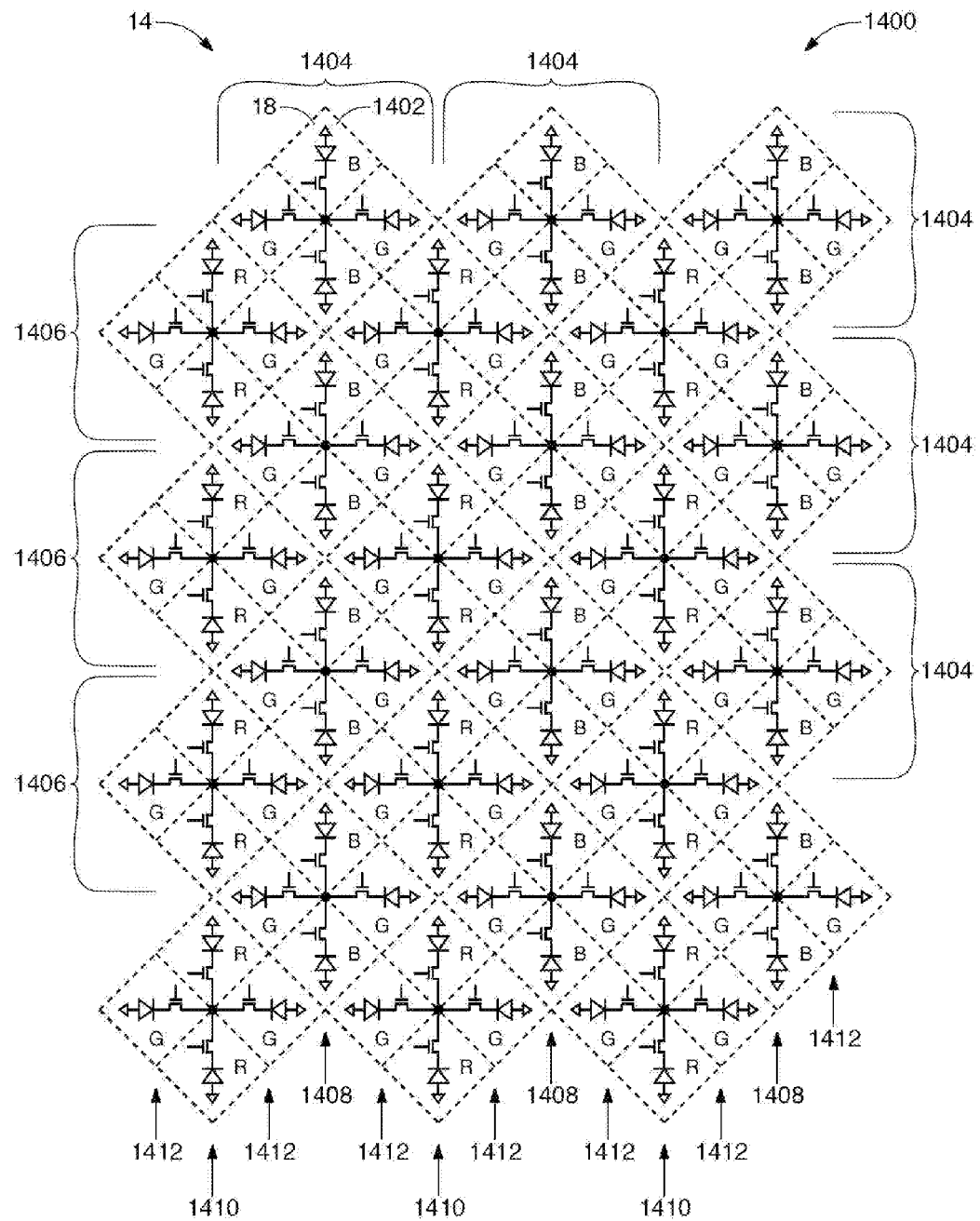
FIG. 14 is a diagram of an illustrative color filter array pattern that may include vertically adjacent red, blue, and green filters and that may be a part of an imager that may implement an in-pixel charge summing readout mode and that may incorporate a shared readout scheme in accordance with an embodiment of the present invention.

An embodiment of a color filter array pattern that may include vertically adjacent pairs of red, blue, and green filters is illustrated in FIG. 14. The color filter array pattern 1400 of FIG. 14 may be a pattern similar to the color filter array pattern 800 of FIG. 8 except with all the blue pixels 18 in a first set of columns 1408, the red pixels 18 in a second set of columns 1410, and the green pixels 18 in a third set of columns 1412 of an array such as array 14 of FIG. 2 that incorporates pattern 1400. This type of arrangement facilitates charge summing between vertically adjacent red and blue pixels 18 and for horizontally adjacent green pixels 18. With one arrangement, array 14 (FIG. 2) may incorporate the pattern 1400 such that each of the pixels 18 of array 14 are associated with one of the filters 1402 of pattern 1400 (as an example).

In the example of FIG. 14, array 14 may implement a four way shared readout scheme. For example, the two green pixels 18 and the two blue pixels 18 of pixel groups 1404 may each have an associated transfer transistor and may share a common node coupled to a shared reset transistor, a shared column select transistor, and a shared source follower transistor. Similarly, the two green pixels 18 and the two red pixels 18 of pixel groups 1406 may each have an associated transfer transistor and may share a common node coupled to a shared reset transistor, a shared column select transistor, and a shared source follower transistor.

Figure 15:
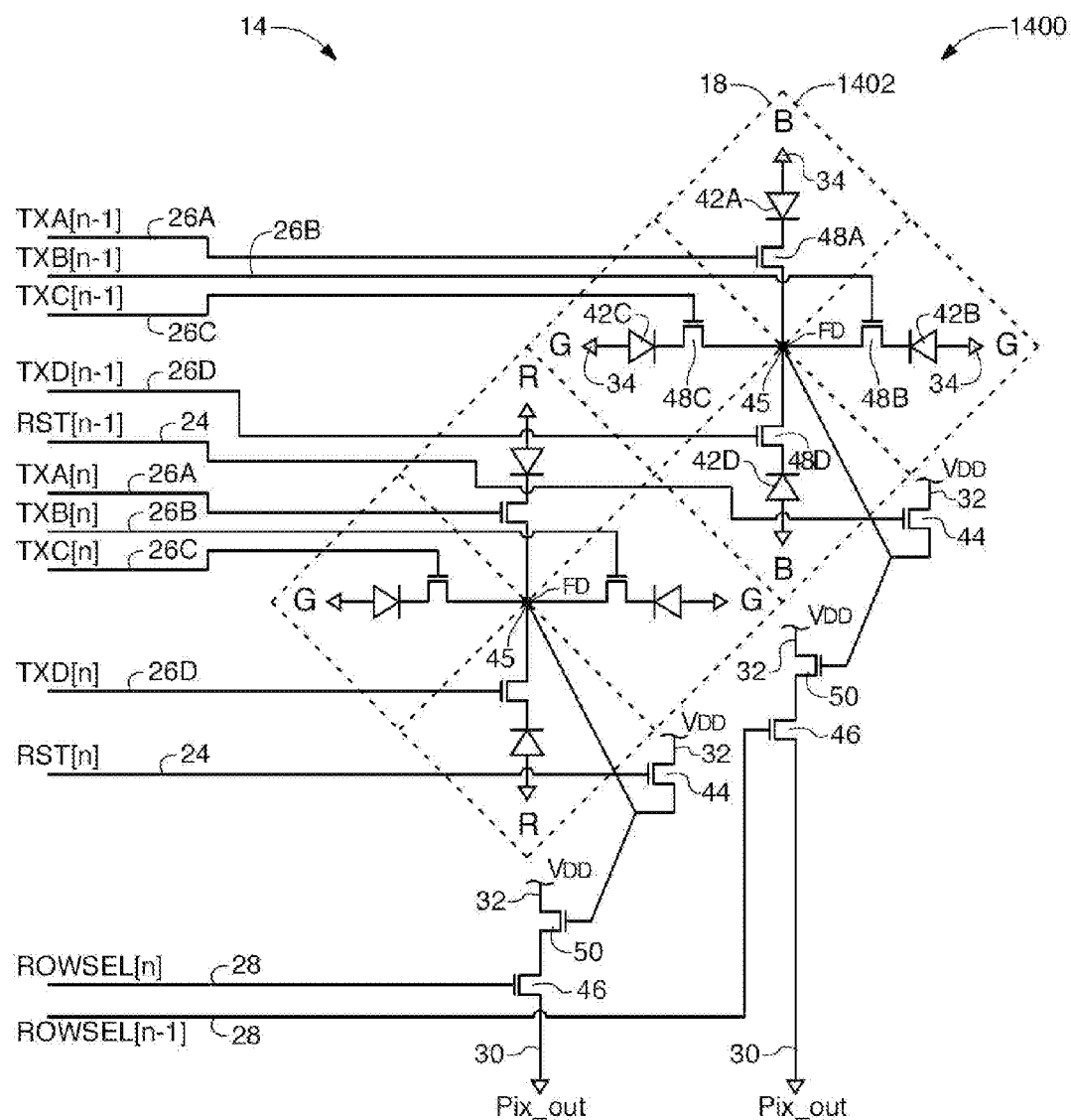
FIG. 15 is a diagram of illustrative light-sensitive pixels that may be a part of an imager that may implement an in-pixel charge summing readout mode, that may incorporate a shared readout scheme, and that may incorporate the color filter array pattern of FIG. 14 in accordance with embodiment of the present invention.

FIG. 15 shows a more detailed view of the light-sensitive pixels 18 that may be used in the arrangement of FIG. 14. In particular, FIG. 15 shows one potential way in which array 14 may implement an in-pixel charge summing readout mode and a shared readout scheme. As shown in the example of FIG. 15, groups of four image sensors 18 may be coupled to shared reset lines 24 (FIG. 2), shared row select lines 28, shared power supply lines 32 and 34, shared image readout lines 30, and a shared node 45 (e.g., the floating diffusion FD node in FIG. 15). As an example, two green and two red pixels 18 may form a first group of pixels in array 14 (e.g., group n) and two green and two blue pixels 18 may form a second group of pixels (e.g., group n-1).

As shown in FIG. 15, each pixel 18 may include a transfer transistor 48. For example, the pixels 18 in group n and group n-1 may include transfer transistors 48A, 48B, 48C, and 48D. Each group of four pixels 18 may include a shared reset transistor 44, a shared readout transistor 46 (sometimes referred to herein as a row select transistor 46), and a shared buffer transistor 50 (sometimes referred to herein as a source follower transistor 50). The four pixels 18 in each group of four pixels may be coupled to a shared node 45.

Each pixel 18 may include a photosensitive device such as photodiode 42 (e.g., a photosensitive element 42). The photosensitive device 42 in each pixel 18 of array 14 may accumulate charge in response to incident light (e.g., light which strikes the photosensitive device 42).

Shared reset transistor 44 may be controlled by shared reset line 24. When reset signals such as RST[n] and RST[n-1] signals on reset line 24 are asserted, transistor 44 may be turned on and may allow accumulated charge on shared node 45 to flow into a power supply line (e.g., through power supply line 32). In one embodiment, transfer signals (TX) on transfer lines 26A, 26B, 26C, and 26D may be asserted simultaneously with the reset signals (RST) such that the accumulated charges on the four photosensitive elements 42A, 42B, 42C, and 42D and the diffusion node 45 shared by the group pixels 18 in a group of pixels are reset simultaneously.

Each of the transfer transistors 48A, 48B, 48C, and 48D in a group of pixels 18 may be controlled by the respective transfer lines 26A, 26B, 26C, and 26D. When transfer signals (TXA) on transfer line 26A are asserted, transistor 48A may be turned on and may allow charge to flow from photodiode 42A to the shared node 45. When transfer signals (TXB) on transfer line 26B are asserted, transistor 48B may be turned on and may allow charge to flow from photodiode 42B to the shared node 45. When transfer signals (TXC) on transfer line 26C are asserted, transistor 48C may be turned on and may allow charge to flow from photodiode 42C to the shared node 45. When transfer signals (TXD) on transfer line 26D are asserted, transistor 48D may be turned on and may allow charge to flow from photodiode 42D to the shared node 45.

With one arrangement, the charges of pairs of commonly-colored pixels 18 in each group of four pixels 18 may be summed onto the shared node 45. With this type of arrangement, transfer signals (TXA and TXD) may be asserted at the same time to turn on transistors 48A and 48D and to allow charge to flow from the red (or blue) photodiodes 42A and 42D and sum onto the shared node 45. Transfer signals (TXB and TXC) may be asserted at the same time to turn on transistors 48B and 48C and to allow charge to flow from the green photodiodes 42B and 42C and sum onto the shared node 45. In this arrangement, a first charge summing and readout operation may sum together and read out the green pixels 18 in a group of four pixels and a second separate charge summing and readout operation may sum together and read out the red (or blue) pixels 18 in the group of four pixels.

Shared buffer transistor 50 and shared row select transistor 46 may be used during a readout operation of any single one of the pixels 18 in a group of four pixels 18, a readout of the green pixels in the group when the charges of the green pixels are summed together, and a readout of the blue (or red) pixels in the group when the charges of the blue (or red) pixels are summed together. Readout transistor 46 may be controlled by row select (ROWSEL[n] and ROWSEL[n-1]) signals on row select line 28 and buffer transistor 50 may be controlled by the charge on shared node 45. When row select signals on line 28 are asserted, transistor 46 may be turned on and the charge on node 45 may be used to control transistor 50. The voltage that the charge on node 45 applies to the gate of transistor 50 may then determine the voltage of column readout (Pix_out) line 30. Image readout circuitry 20 of FIG. 2 may then determine the voltage of the accumulate charge by sampling the voltage of line 30. If desired, the image readout circuitry 20 may utilize a correlated double sampling technique in which the reset level of the node 45 is also measured.

Various embodiments have been described illustrating image sensors and color filter arrays for in-pixel charge summing readout modes and for interlaced readout modes. The image sensors may be used in any electronic device. If desired, the image sensors may also use a shared readout scheme.

One color filter array pattern that may be used may include diagonally adjacent pairs of green, red, and blue pixels arranged in horizontal rows and columns.

A second color filter array pattern that may be used may include vertically adjacent pairs of green, red, and blue pixels with columns of alternating pairs of red and blue pixel pairs and columns of green pixel pairs. The second color filter array pattern may be arranged with rows that zigzag in a horizontal direction.

A third color filter array pattern that may be used may include vertically adjacent pairs of green, red, and blue pixels with a repeating pattern of columns formed from red pixel pairs, green pixel pairs, blue pixel pairs, and green pixels pairs. The third color filter array pattern may be arranged with rows that zigzag in a horizontal direction.

Image sensors that incorporate any of these color filter array patterns may implement an in-pixel charge summing readout mode. In an in-pixel charge summing readout mode, charges from two commonly-colored pixels may be summed together prior to a readout operation.

Image sensors using any of these color filters may implement an interlaced readout mode. In an interlaced readout mode, interlaced images are read out from the image sensor by only retrieving data from a portion of the light sensitive pixels in the image sensor.

If desired, the image sensors may use a shared readout scheme. In a shared readout scheme, a plurality of pixels whose charges may or may not be summed together share some circuitry such as reset transistors, buffer transistors, floating diffusion nodes, and readout transistors. With one arrangement, an image sensor may implement a shared readout scheme in conjunction with a in-pixel charge summing readout mode. With this type of arrangement, charges from a first pair of commonly-colored pixels in a group of four pixels may be transferred to and summed onto a common node for the group of four pixels. After the summed charge from the first pair of pixels has been read out by image readout circuitry, charges from a second pair of commonly-colored pixels in the group of four pixels may be transferred to and summed onto the common node.

The foregoing is merely illustrative of the principles of this invention which can be practiced in other embodiments.

What is claimed is:

1. An array of image sensing pixels, wherein the array of image sensing pixels includes a plurality of vertical columns and wherein each of the vertical columns spans substantially entirely across the array in an approximately vertical direction, the array comprising:
 a repeating block of eight pixels, wherein the repeating block of eight pixels comprises:
  four pixels of a first color arranged in two pairs of horizontally adjacent pixels;
  two pixels of a second color arranged in a pair of vertically adjacent pixels; and
  two pixels of a third color arranged in a pair of vertically adjacent pixels, wherein a first plurality of the vertical columns comprises vertical columns formed entirely from pixels of the first color, wherein each of the pixels in the repeating block of eight pixels includes a photosensitive element and a transfer transistor coupled to the photosensitive element, and wherein the repeating block of eight pixels includes two charge summing lines each of which is connected to four of the transfer transistors of the pixels in the repeating block of eight pixels.

2. An array of image sensing pixels, wherein the array of image sensing pixels includes a plurality of vertical columns and wherein each of the vertical columns spans substantially entirely across the array in an approximately vertical direction, the array comprising:
 a repeating block of eight pixels, wherein the repeating block of eight pixels comprises:
  four pixels of a first color arranged in two pairs of horizontally adjacent pixels;
  two pixels of a second color arranged in a pair of vertically adjacent pixels; and
  two pixels of a third color arranged in a pair of vertically adjacent pixels, wherein a first plurality of the vertical columns comprises vertical columns formed entirely from pixels of the first color, wherein each of the pixels in the repeating block of eight pixels includes a photosensitive element and a transfer transistor coupled to the photosensitive element, wherein the repeating block of eight pixels includes a first charge summing line connected to the transfer transistors of a first pair of the two pairs of horizontally adjacent pixels of the first color and the pair of vertically adjacent pixels of the second color, and wherein the repeating block of eight pixels includes a second charge summing line connected to the transfer transistors of a second pair of the two pairs of horizontally adjacent pixels of the first color and the pair of vertically adjacent pixels of the third color.

3. The array of image sensing pixels defined in claim 2 further comprising:
 a plurality of column readout lines each of which is coupled to a plurality of the first charge summing lines; and
 a plurality of column readout lines each of which is coupled to a plurality of the second charge summing lines.

4. The array of image sensing pixels defined in claim 1 wherein a second plurality of the vertical columns comprises vertical columns entirely formed from pairs of vertically adjacent pixels of the second color and pairs of vertically adjacent pixels of the third color.

5. The array of image sensing pixels defined in claim 1 wherein a second plurality of the vertical columns comprises vertical columns formed entirely of pairs of vertically adjacent pixels of the second color and wherein a third plurality of the vertical columns comprises vertical columns formed entirely of pairs of vertically adjacent pixels of the third color.

6. The array of image sensing pixels defined in claim 1 wherein the four pixels of the first color comprise four green pixels, wherein the two pixels of the second color comprise two red pixels, and wherein the two pixels of the third color comprise two blue pixels.

7. The array of image sensing pixels defined in claim 6 wherein a second plurality of the vertical columns comprises vertical columns formed entirely of pairs of vertically adjacent red pixels and wherein a third plurality of the vertical columns comprises vertical columns formed entirely of pairs of vertically adjacent blue pixels.

8. An imager comprising:
an array of image sensing pixels arranged in vertical columns and horizontal rows that are arranged in a zigzag pattern across the array, wherein the vertical columns of the array include vertical columns of green pixels, wherein the array of image sensing pixels comprises:
a plurality of charge summing lines each of which is connected between two vertically adjacent pixels in the array, wherein the vertical columns include vertical columns with alternating pairs of red pixels and pairs of blue pixels.

9. The imager defined in claim 8 wherein the vertical columns of green pixels comprise pairs of vertically adjacent green pixels and wherein the array of image sensing pixels comprises:
a first plurality of charge summing lines in the plurality of charge summing lines, wherein each of the charge summing lines in the first plurality of charge summing lines is connected between two green pixels in one of the pairs of vertically adjacent green pixels;
pairs of vertically adjacent red pixels;
a second plurality of charge summing lines in the plurality of charge summing lines, wherein each of the charge summing lines in the second plurality of charge summing lines is connected between two red pixels in one of the pairs of vertically adjacent red pixels;
pairs of vertically adjacent blue pixels; and
a third plurality of charge summing lines in the plurality of charge summing lines, wherein each of the charge summing lines in the third plurality of charge summing lines is connected between two blue pixels in one of the pairs of vertically adjacent blue pixels.

10. The imager defined in claim 8 further comprising a plurality of row select lines each of which is connected to the pixels in a given one of the horizontal rows that are arranged in the zigzag pattern across the array and a plurality of readout lines each of which is connected to the pixels in a given one of the vertical columns.

11. The imager defined in claim 10 further comprising:
control circuitry coupled to the row select lines and the readout lines, wherein the control circuitry is configured to read out an interlaced image from the array by asserting row select signals on alternating row select lines.

* * * * *